(12) United States Patent
Lassota

(10) Patent No.: US 6,821,539 B2
(45) Date of Patent: Nov. 23, 2004

(54) METHOD FOR MAINTAINING TEMPERATURE OF A BEVERAGE BY SELF-HEATING A HOT BEVERAGE SERVING URN

(75) Inventor: Zbigniew G. Lassota, Long Grove, IL (US)

(73) Assignee: Food Equipment Technologies Company, Inc., Lincolnshire, IL (US)

( * ) Notice: Subject to any disclaimer, the term of this patent is extended or adjusted under 35 U.S.C. 154(b) by 0 days.

(21) Appl. No.: 10/350,195

(22) Filed: Jan. 23, 2003

(65) Prior Publication Data

US 2003/0150332 A1 Aug. 14, 2003

Related U.S. Application Data (62) Division of application No. 09/841,399, filed on Apr. 24, 2001, now Pat. No. 6,606,937.
(60) Provisional application No. 60/199,628, filed on Apr. 25, 2000.

(51) Int. Cl.[7] .............................. A23F 3/00; A23F 5/00
(52) U.S. Cl. ........................ 426/231; 426/241; 426/520
(58) Field of Search ................................ 426/231, 241, 426/520; 99/275, 290

(56) References Cited

U.S. PATENT DOCUMENTS 4,983,798 A * 1/1991 Eckler et al. ............... 219/730

* cited by examiner

Primary Examiner—George C. Yeung
(74) Attorney, Agent, or Firm—James W. Potthast; Potthast & Associates (57) ABSTRACT

A method of maintaining temperature of a hot beverage in an urn with a self-heating urn (10) provided with heat packs (18) that are rapidly heated during the brewing process and then gradually release their heat to the brewed beverage within the urn after it is removed from the brewing location to a serving location at which electrical powered for heating is not available. The heat packs (18) are formed of ceramic materials, high density liquids, PCM's or the like which are capable of being rapidly heated during the brewing process but then gradually release their heat to the beverage in the urn. Alternatively, the warmer packs (18) are removably mounted within a compartment (68) within the self-heating urn (10) and are heated apart from the brewing process and then inserted into the self-heating urn (10) when it is moved to a serving location.

57 Claims, 5 Drawing Sheets

METHOD FOR MAINTAINING TEMPERATURE OF A BEVERAGE BY SELF-HEATING A HOT BEVERAGE SERVING URN

CROSS REFERENCE TO RELATED APPLICATIONS

This application is a divisional of and claims the benefit of U.S. application Ser. No. 09/841,399 filed Apr. 24, 2001 now U.S. Pat. No. 6,606,987, that, in turn, claims the benefit under 35 U.S.C. Section 119(e) of U.S. provisional application Serial No. 60/199,628 filed Apr. 25, 2000, of the same inventor as the present application and entitled, "Self-Heating Hot Beverage Serving Urn and Method".

BACKGROUND OF THE INVENTION

1. Field of the Invention

This invention relates to a method of heating hot beverage serving urns and methods of keeping the hot beverage hot while within the urn.

2. Discussion of the Prior Art

Coffee urns of the type into which coffee is directly brewed at a brewing location and then moved to a serving location where the coffee, tea or other brewed beverage is served from a serving faucet, or spigot, are well known in the art of brewing and serving of hot coffee and tea. In order to keep the brewed beverage at the desired temperature at which it was freshly brewed, it is generally preferable to fill the urn with the hot beverage. Such urns come in different sizes such as one, one and one half, two and three gallons.

A problem with such serving urns is that often the coffee becomes too cool for good quality before the urn is depleted. In order to overcome this problem, it is known to an internal or external electrically powered heating element. It is also known to insulate the urn to reduce heat loss after the urn is filled with beverage. Heat loss occurs by way of radiation. Heat loss also occurs by direct loss when hot beverage is served from the dispensing urn, and the heat of the beverage is physically removed from the beverage. As a consequence of such heat loss, the serving time during which the beverage is still above the minimum serving temperature, for best flavor and desirability, is only approximately one to one and one half hours if the dispensing urn is initially filled to capacity. If the urn is not filled to capacity but is only half filled, for instance, then the serving time may be reduced proportionately with the reduction in percentage of full capacity. Part of the problem is that the NSF and brewer industry standards require the use of stainless steel that has a relatively high rate of heat transfer.

The known ways of overcoming this serving time limitation include not moving the serving urn from the location at which it is brewed and keeping it on an external hot plate or other external heating element at the brewing location. This approach disadvantageously ties up the brewing location such that other urns cannot be filled, and, of course, demands that servers return to the original brewing location to serve the beverage into a smaller serving container such as a carafe or into a cup for direct service.

Alternatively, it is know to move the urn closer to the serving location and then place it on an electrical hot plate at another location or, to provide the urn with an internal heating element that is plugged into an AC power outlet for receipt of electrical power at a remote location in order to maintain the temperature of the beverage at the desired temperature. The need for a source of electrical power, at hand, to power the hot plate or internal heating element, and is not convenient when it is desired to locate the urn in a central location away from an AC power wall outlet. Even if there are floor outlets, if the urn is placed on a table, then a power cord must come up from the floor and rest upon table to reach the hot plate or the connection to the urn, itself, in the case of an internal, electrically powered heating element.

Another problem with electrical heaters is that controlling the heating element requires a thermo-mechanical or electronic thermostat to insure that not to much heat is added to the urn. Too much heat due to power surges or improper calibration can result in reduction of the beverage due to evaporation and overheating of the flavor elements of the brew. Both of these conditions may undesirably alter the flavor and aroma of the beverage being served. Coffee that is served too hot can also create risk of scalding and potential civil liability to the server. Likewise, there may be an increased risk of liability associated with electrical power cords lying on a service floor and hot plates and continuously electrically powered or thermostatically controlled electrically powered heating elements.

As a consequence of the problems associated with electrically powered heating elements and hot plates, noted above, and also with the non-heated, insulated urn which does not keep the beverage above a minimum desired temperature for longer an 1–2 hours, particularly in the case of less than a full brew capacity filling the urn, there is an unfulfilled need in the market of commercial coffee brewers and serving systems and the like for methods for maintaining temperature of hot beverages within a serving urn that overcomes these limitations and disadvantages.

SUMMARY OF THE INVENTION

In accordance with the present invention, the problems noted above that are associated with the failure of non-heated urns to maintain heated beverages above a minimum time period desired by the commercial brewer user industry and the disadvantages associated with electrically powered hot plates or internal electrical heating elements, are overcome.

This objective is achieved in part by providing a method of maintaining temperature of a hot beverage within a beverage urn by performing the steps of steps of inserting a hot beverage within an urn body having an outer housing protectively containing a liner for storage of hot beverage, and a compartment for containing a heat pack having a zeolite-like material that is one of (a) hydrated salt and a eutectic salt, heating the heat pack by adding water vapor to the zeolite-like material to initiate an exothermic phase change reaction, placing the heat pack into the compartment in heat transferring relationship with the liner for transferring heat from the heat pack to the liner and any beverage contained within the liner; moving the urn to a serving location spaced from the external source of power; and transferring heat from the heat pack to the liner and any beverage contained within the liner at the serving location.

The objective is also obtained in part by providing a method of maintaining temperature of a hot beverage within a beverage urn, comprising the steps of inserting a hot beverage within an urn body having an outer housing protectively containing a liner for storage of hot beverage, and a compartment for containing a heat pack formed of a composite ceramic sandwich having an interior ceramic core with a relatively high rate of heat transfer contained within an outer envelope layer of ceramic of relatively low rate of heat transfer; heating the interior ceramic core, placing the heat pack into the compartment in heat transferring relationship with the liner for transferring heat from the heat pack to the liner and any beverage contained within the liner, moving the urn to a serving location spaced from the external source of power; and transferring heat from the heat pack to the liner and any beverage contained within the liner at the serving location.

Also, the objective is achieved by providing a method of maintaining temperature of a hot beverage within a beverage urn by performance of the steps of directly brewing a hot beverage into an urn body having an outer housing protectively containing a liner for storage of hot beverage, and a compartment for containing a heat pack, placing a heat pack within the compartment in heat transferring relationship with the liner for transferring heat from the heat pack to the liner and any beverage contained within the liner, heating the heat pack during a brew cycle of the brewer with a heat pack heating apparatus associated with the brewer, moving the urn to a serving location spaced from the external source of power; and transferring heat from the heat pack to the liner and any beverage contained within the liner at the serving location.

Additionally, the objective is obtained by providing a method of maintaining temperature of a hot beverage within a beverage urn by performing the steps of inserting a hot beverage within an urn body having an outer housing protectively containing a liner for storage of hot beverage, and a compartment for containing a heat pack having a zeolite-like material that is one of (a) hydrated salt and a eutectic salt, heating the heat pack by adding water vapor to the zeolite-like material to initiate an exothermic phase change reaction, placing the heat pack into the compartment in heat transferring relationship with the liner for transferring heat from the heat pack to the liner and any beverage contained within the liner; moving the urn to a serving location spaced from the external source of power, and transferring heat from the heat pack to the liner and any beverage contained within the liner at the serving location.

Further, the objective is obtained partly by providing method of maintaining temperature of a hot beverage within a beverage urn composed of the steps of inserting a hot beverage within an urn body having an outer housing protectively containing a liner for storage of hot beverage, and a compartment for containing a heat pack formed of a composite ceramic sandwich having an interior ceramic core with a relatively high rate of heat transfer contained within an outer envelope layer of ceramic of relatively low rate of heat transfer; heating the interior ceramic core, placing the heat pack into the compartment in heat transferring relationship with the liner for transferring heat from the heat pack to the liner and any beverage contained within the liner, moving the urn to a serving location spaced from the external source of power; and transferring heat from the heat pack to the liner and any beverage contained within the liner at the serving location.

Moreover, the objective is acquired by providing a method of maintaining temperature of a hot beverage within a beverage urn having the steps of directly brewing a hot beverage into an urn body having an outer housing protectively containing a liner for storage of hot beverage, and a compartment for containing a heat pack, placing a heat pack within the compartment in heat transferring relationship with the liner for transferring heat from the heat pack to the liner and any beverage contained within the liner; heating the heat pack during a brew cycle of the brewer with a heat pack heating apparatus associated with the brewer, moving the urn to a serving location spaced from the external source of power, and transferring heat from the heat pack to the liner and any beverage contained within the liner at the serving location.

BRIEF DESCRIPTION OF THE DRAWING

The foregoing advantageous features of the method of the present invention will be made apparent and others will be disclosed in the detailed description that is given with reference to the several figures of the drawing, in which.

DETAILED DESCRIPTION

Figure 1:
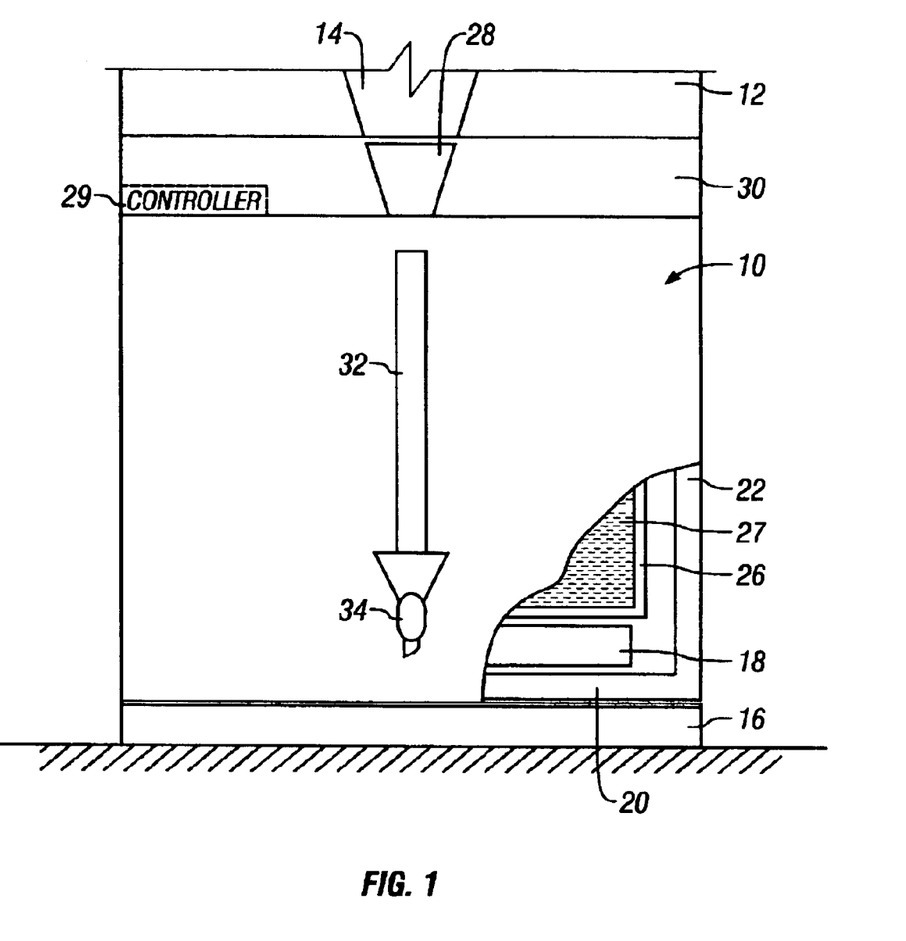
FIG. 1 is a schematic side elevation view of a preferred embodiment of the self-heating beverage urn of the present invention with portions broken away to reveal the permanently installed warmer pack.

Referring now to FIG. 1, the self-heating beverage urn 10 of the present invention is seen as mounted in operative relationship with its brewer 12. The brewer 12 has an upper housing that contains all of the customary brewer elements including a hot water reservoir, dispense valves for dispensing the hot water into the top of a removable brew basket 14, a controller for controlling the dispense valve and other elements of the brewer 12.

These conventional elements form no part of the present invention, and reference may be made to U.S. Pat. No. 5,000,082 issued to Lassota on Mar. 19, 1991 for "Beverage Maker and Method of Making Beverage"; U.S. Pat. No. 5,331,885 issued to Lassota on Jul. 26, 1994 for "Semiautomatic Beverage Maker and Method"; U.S. Pat. No. 5,943,944 issued to Lassota on Aug. 31, 1999, for "Brewing System with Hot Water Urn Flushing Apparatus"; U.S. Pat. No. 5,953,981 issued to Lassota on Sep. 21, 1999; and patents cited therein, hereby incorporated by reference, for further information concerning such standard features.

What is unconventional about the brewer 12 is that it includes a heating element 16 for heating a warmer pack, or heat pack, 18. The warmer pack 18 rapidly receives heat from the heating element 16 and then slowly releases the self-heating, heat to a liner 26 and its contents to keep the beverage 27 warm for a longer time then could otherwise be obtained with only insulation. The warmer pack 18 is located adjacent a bottom 20 of an outer cylindrical, stainless steel container 22 and beneath the bottom 24 of the cylindrical glass liner 26. The glass liner 26 is supported by the stainless steel container 22, and the beverage 27 is contained within the glass liner 26. The beverage 27 is brewed directly from the brew basket 14 into the upper end of an inlet funnel 28 that passes through a removable, insulated lid 30. A transparent sight 32 indicates the level of the beverage 27 within the container 22, and a spigot 34 is provided for serving the beverage from the urn 10.

The heating element 16 may be in the form of a hot plate and is preferably attached to the lower housing of the brewer 12, and the heat the element delivers is controlled by a microprocessor based controller 29 contained within the brewer 12. Preferably, the rate of heating and the time period of heating are controlled by the microprocessor based controller 29.

Alternatively, depending upon the nature of the warmer pack, the heating element is a microwave generator for remotely heating the warmer pack or other heating element 18 or other as explained below.

The controller 29 is preferably microcomputer controlled and includes the usual elements of a microcomputer, including a microprocessor; a software memory; a data memory for storing programmable parameter information and sensory input data; a display unit including an alphanumeric display; a keyboard, switches or other manual programming input device; and interface circuits for interfacing the microprocessor with the other elements. All of these elements may be conventional and again the details of the controller, except as otherwise specified herein, do not form a part of the invention. If details are needed with respect to a suitable type of controller, reference should be made to the patents referenced herein.

Figure 2:
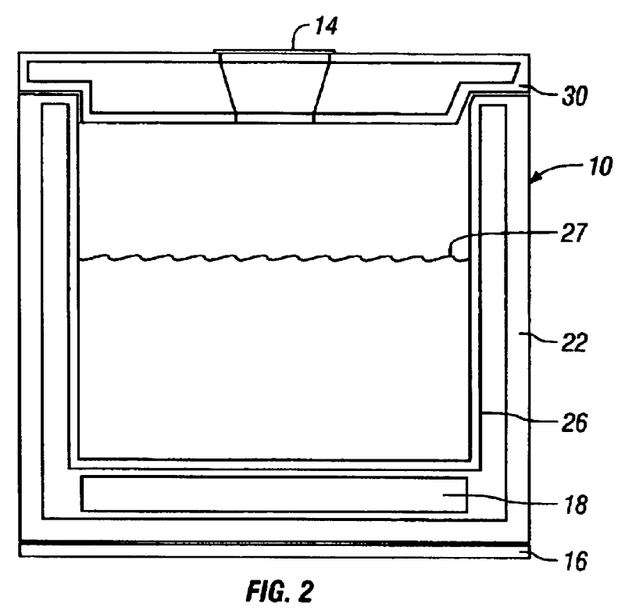
FIG. 2 is a sectional side view of the self-heating urn of FIG. 1 in which the warmer pack is a container of phase change materials, of high-density liquids or a ceramic composite.

Referring to FIG. 2, the heating element 16 is preferably coextensive with the bottom 20, and the warmer pack 18. When the temperature of the heating element 16 is heated, the heat rises and elevates the temperature of the heater pack through convection and radiant heat.

Figure 3:
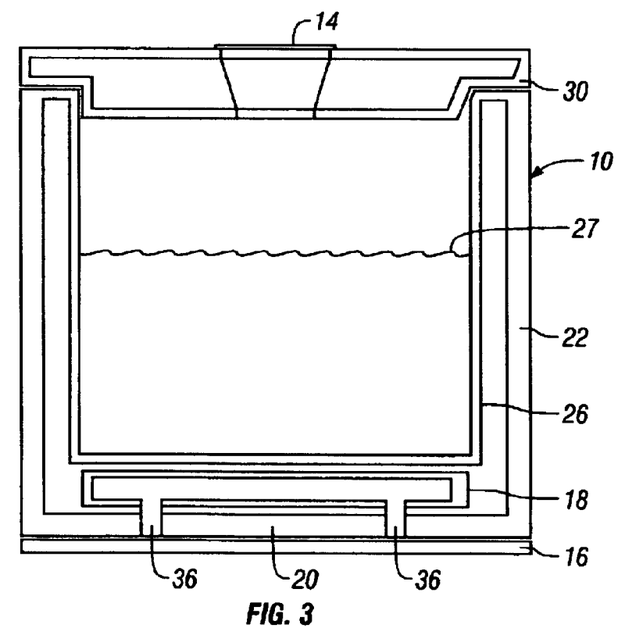
FIG. 3 is a sectional side view of another form of the invention in which the interior of the heater pack has legs extending from the center to be closer to the heating element.

Referring to FIG. 3, in some embodiments it may be desirable to provide a more direct link between the interior of the heater pack 18 and the heating element 16 by means of heat conducting legs 36. One or more of these heat-conducting legs extend from adjacent the heating element 16, through the stainless steel bottom 20 and into the interior of the heat pack 18 to facilitate heating of the heat pack 18.

Figure 4:
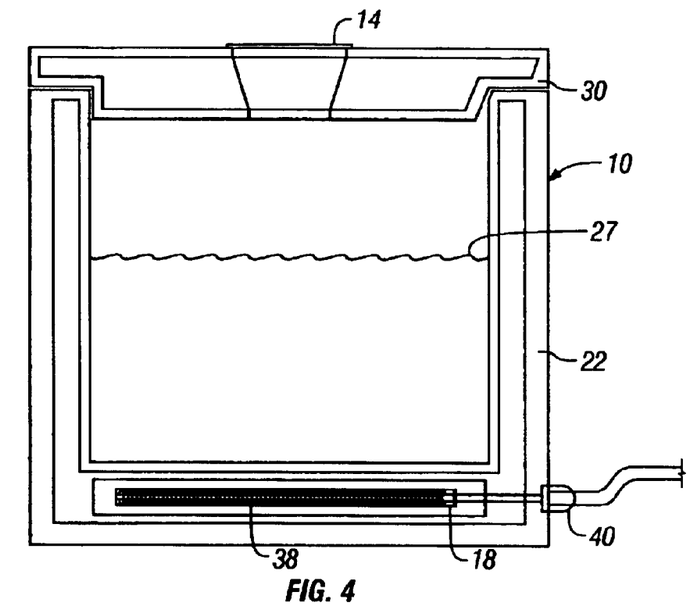
FIG. 4 is a sectional side view of another type of heating pack in which an electrical heater is contained within the interior and is directly heated by electrical power.

Referring to FIG. 4, in another embodiment of the self-heating urn, the warmer pack 18 is provided with an interior electro-resistive heating coil or other interior electrical heating element that is connected to a source of electricity through a plug 40 or other suitable releasable connector and a switch (not shown) controlled by the controller. The interior, heating element 38 provides the initial heat internally to the warmer pack 16, itself, or beneath the warmer pack 18, but within the urn 10 and above the stainless steel bottom 20. The connection with the releasable connector 40 is preferably automatically made whenever the urn is slid into the correct position beneath the brew basket 14, as shown in FIG. 1. Application of electrical power to the heating coil 38 is controlled by the controller 29 to provide the correct amount of heat.

Figure 5:
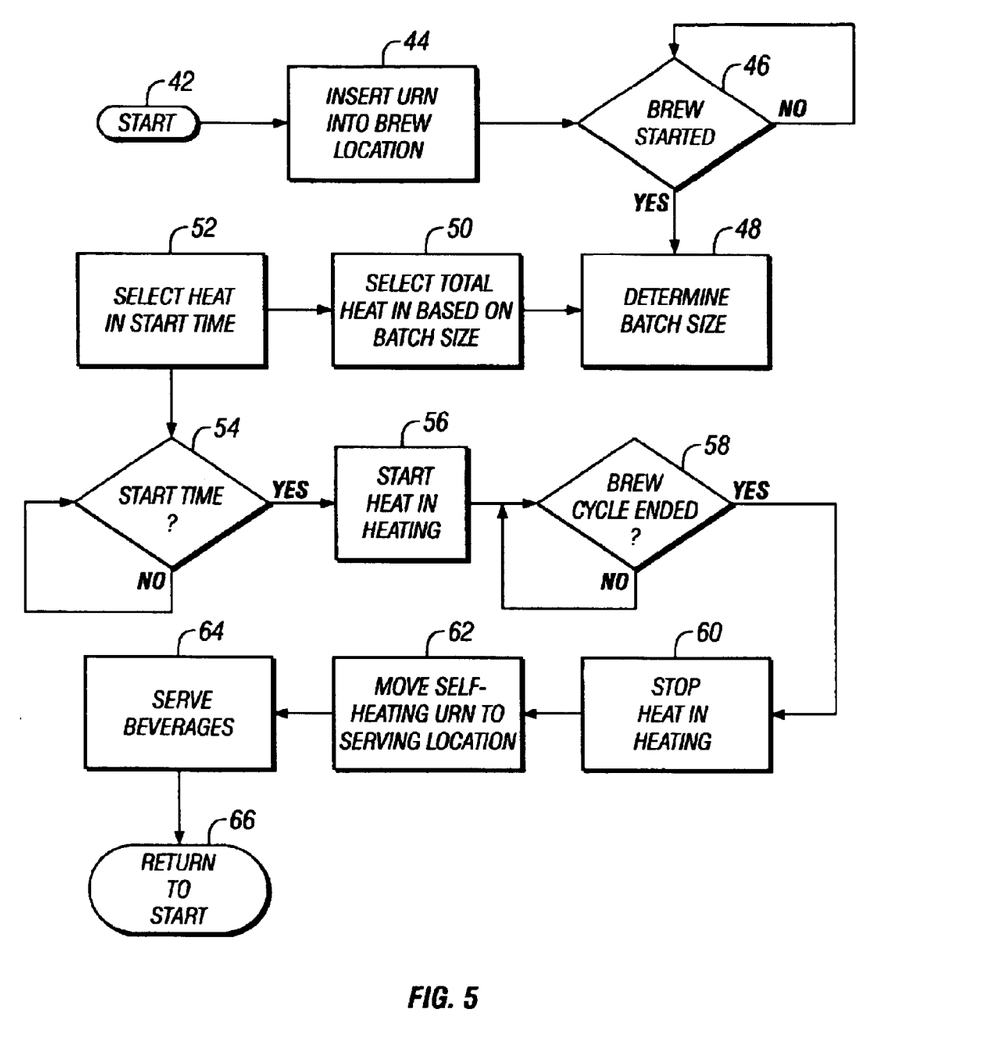
FIG. 5 is a flow chart of the steps taken in practicing the beverage brewing and serving method of the present invention when the warmer pack is permanently installed in the urn.

Referring to FIG. 5, the method of the invention of brewing and serving heated beverage 27 is illustrated. After the start in step 42, in step 44 the self-heating urn 10 is inserted into the brew location, as shown if FIG. 1. Next in step 46, a determination is made as to whether a new brew cycle has begun. If a start brew switch is actuated, then a brew cycle begins, and the size of the batch of beverage that is produced is dependent upon which of the several start brew switches is actuated, there being different size batches associated with different ones of the plurality of start brew switches. In step 48, the controller determines the batch size, for instance, from a determination of which of the several start brew switches is actuated.

If a full batch, i.e. a batch of beverage that will substantially fill the entire urn, then one quantity of heat will be required to keep the full batch warm for the desired time period. If a smaller batch is selected, i.e. one that does not fill the entire urn 10, then a different total quantity of heat will be needed to maintain the preselected minimum temperature for the preselected time. Accordingly, in step 50 a determination is made as to the total heat that will be required based upon the batch size selection determined in step 48. In accordance with one of the methods of the invention, the actual amount of heat that needs to be added is determined empirically by trying different amounts with different quantities to achieve the desired temperature for the desired length of time. The actual amount of time and minimum temperature is a matter of choice.

Next, in step 52, if the rate of heating remains fixed, then the time to start heating the warmer pack after commencement of the brew cycle. This time period is determined based on the total heat that will be added. If the maximum heat requires heating throughout the entire brew cycle, then to add a lesser amount of heat, a lesser time period is required. In such case, there must be a time delay after commencement of the brew cycle before power is applied to the heating element 16. In step 54, a determination is made of the start time to start heating the warmer pack in order for all the desired heat to be added coincident with the ending of the brew cycle. The warmer pack 18 is then at its maximum heat releasing potential when the brew cycle is completed and it is time to remove the self-heating urn to the serving location away from the brewer and the heating element 16.

If the rate of heating by the heating element 16 is controllable then, the time of heating is always preferably the entire time of the brew cycle, and the rate of heating is changed to obtain the total amount of heat desired during the brew cycle.

In step 56, in the case of a constant rate of heating, commencement of heating of the warmer pack begins, and in step 58, a determination is made as to whether the brew cycle has ended. If the brew cycle has ended, then in step 60 the power is removed from the heating element 16 and heating of the warmer pack 18 is complete. In step 62, the self-heating urn 10 with the fully heated warmer pack 18 is moved to the serving location that is remote from the brewer 12. In step 64, the beverage is served from the self-heating urn while remote from the brewer but while the heater pack helps keep the beverage warm without the need for additional electrical power connections. The program returns to start after the beverage is depleted or service is otherwise completed.

Figure 6:
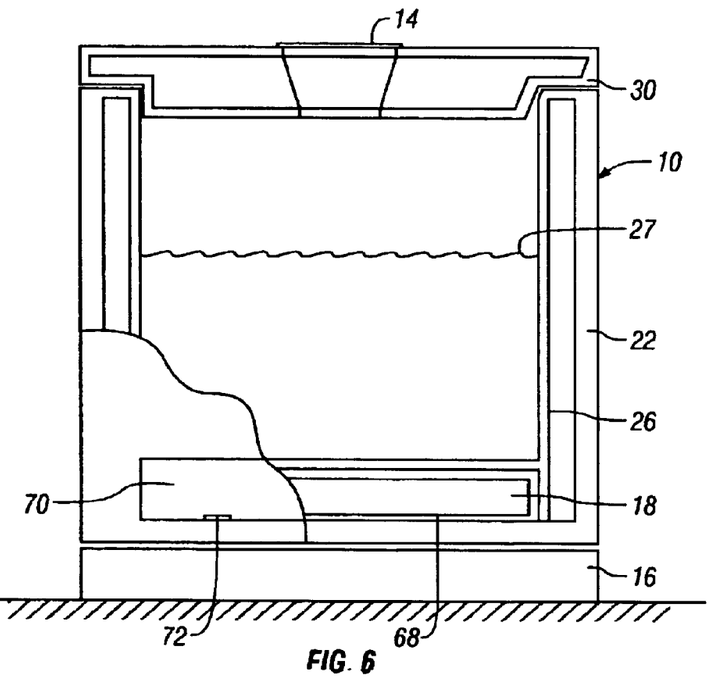
FIG. 6 is a sectional side view of an embodiment of the self heating urn in which the warmer pack is removably installed in the self-heating urn.

Referring now to FIG. 6, another form of the self-heating beverage urn 10 is shown in which the warmer pack 18' is removably mounted within a compartment 68 beneath the glass liner 26 and above the stainless steel bottom 20. Access to the compartment 68 is gained through an insulated door 70 that is mounted by hinges 72 to the side of the urn 10.

Figure 7:
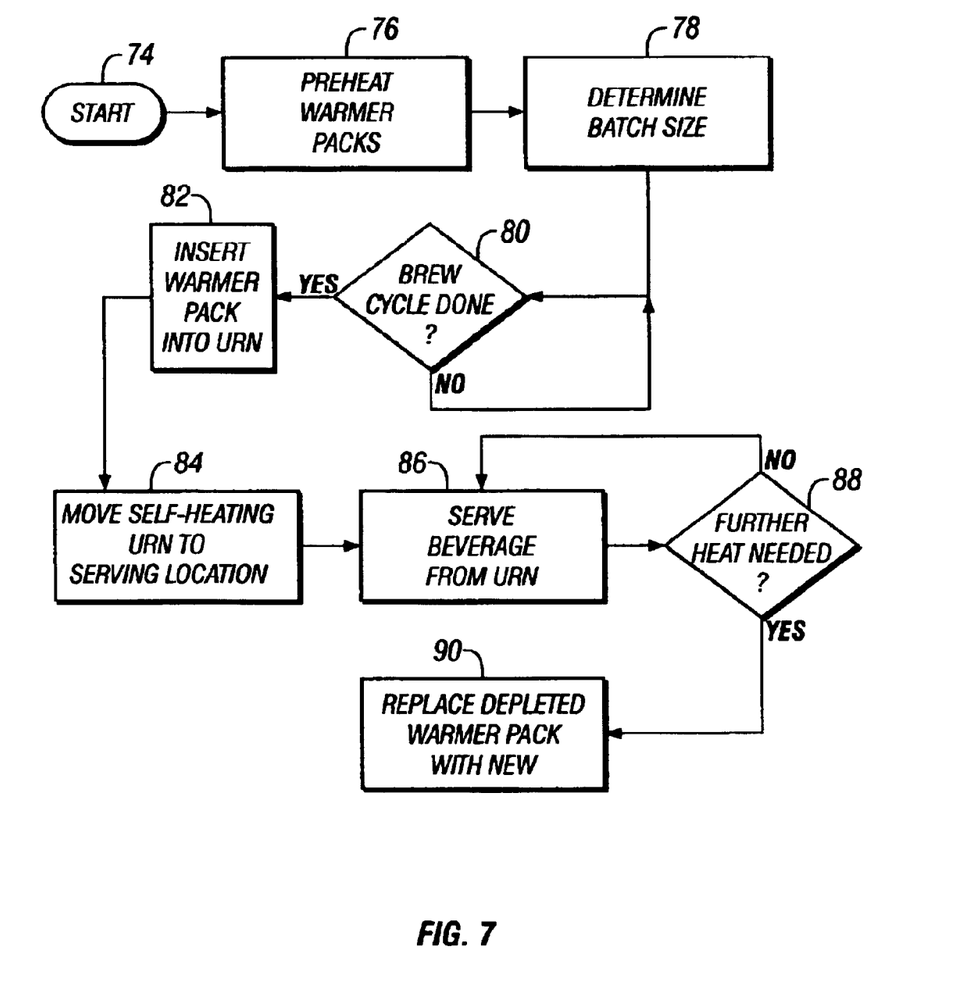
FIG. 7 is a flow chart of the brewing and serving method of the present invention when the removable warmer pack and the urn of FIG. 6 is employed.

Referring to FIG. 7, in accordance with the method of the present invention when using the form of the self-heating urn of FIG. 6, after start 74, the removable warmer packs 18' are pre-heated in step 76. Alternatively, they are heated during the brewing process under control of the brewer controller 29 or are independently heated under a separate controller. Different size removable wanner packs 18' are used for different amounts of heat, or removable packs 18' are heated to different temperatures. The removable packs 18' may be substantially the same as the non-removable packs 18, functionally, may only differ by virtue of the need for a self-contained protective housing or surface that is independent of the body of the urn 10.

In the next step 78 a determination is made as to the batch size that the urn 10 will hold at the end of the brew cycle. This may be done automatically by the brewer controller 29 or by an operator. If the brewer 14 is capable of making multiple batch sizes, then the brewer controller 29 controls the heating of the heater packs 18' by controlling a plurality of associated heaters each having the same or different sized removable heater packs 18'. The controller 29 then selectively heats the selected heater that will be used to the correct temperature needed for the batch size. Alternatively, the controller maintains a plurality of the different heat packs 18 at the different temperatures associated with the different batch sizes.

In step 80, a determination is made as to whether the brew cycle is done. At the completion of the brew cycle the appropriate warmer pack 18 is inserted into the warmer pack compartment 68 of the urn 10 in step 82. In step 84, the urn 10 is moved to the serving location that is remote from the brewer, and in step 86 the beverage 27 is served from the self-heating urn 10. In step 88, if a determination is made that more heat is needed, then in step 90 the original heater pack 18 is removed and replaced with a fresh warmer pack 18' that has been recently heated and has a higher temperature or greater heat potential than the heat pack 18 that has been wholly or partially depleted of it initial heat. After all of the beverage 27 is depleted from the self-heating urn 10, the original or replacement warmer pack 18' is removed from the compartment 68.

The warmer packs 18 may come in three different forms: ceramic sandwich, high-density liquids contained in a compartment, and phase change materials. In the case, of the ceramic sandwich, an interior ceramic with a relatively high rate of heat transfer is enveloped in an outer layer of ceramic of relatively low rate of heat transfer. The interior or core ceramic is quickly heated to a relatively high temperature during the 2½ to four minute brewing process, and then the outer layer gradually releases, or passes, the heat from the core to the beverage.

In the case of high-density liquids, because of their high density, they are capable of absorbing relatively large amounts of heat during the brewing process and then release the heat of the beverage during the serving period.

In the case of phase change materials, the materials absorb energy when they pass from one phase to another, i.e. undergo a phase transition. Generally, the phase transition is from the solid phase to the liquid phase during the heat storage cycle when the beverage is being brewed. Then as the temperature cools during serving, the phase change material reverts from the liquid phase back to the solid phase and in the process releases the heat absorbed during the reverse transition. Such phase change materials, or PCM's, include hydrated salts, eutectic salts and paraffin. Thermal energy is stored during hydration of the thermally dehydrated salt. Such PCM materials continued in a suitable capsule for use in the warmer pack 18 or 18' can be obtained from PCM THERMAL SOLOUTIONS of Naperville, Ill. and Sunnyvale, Calif. and are also commercially available from GSA RESOURCES, INC. at www.gsaresorces. com. PCM brand names include T.E.A.P. TH29, TH58 and TH89 or some combination needed to achieve the desired temperature range.

Other possible sources of heat storage for the warmer packs 18 or 18' includes zeolites. Zeolites are naturally occurring minerals that have a high heat of adsorption and ability to hydrate and dehydrate while maintaining structural stability. The hygroscopic property of zeolites coupled with rapid, intense exothermic reaction when taken from a dehydrated to a hydrated form (heat adsorption) make them useful in the heat storage system of the invention. When charged with heat, the zeolites can store latent heat energy indefinitely if maintained in a controlled environment and not exposed to water vapor. The stored energy can be liberated as needed by simply addition of controlled amounts of water vapor that initiates the exothermic reaction.

While the details of an embodiment of the invention have been provided for illustrative purposes it should be appreciated that there are a varied ways in which the invention may be implemented and that that may be employed without departing from the spirit or scope of the invention as defined in the appended claims.

What is claimed is:

1. A method of self-heating a beverage urn with beverage contained within a liner when removed from any source of power, comprising the steps of:

adding freshly brewed hot beverage to the liner by brewing the hot beverage directly into the liner with an electrical beverage brewer at a first location;

heating a heat pack contained within the urn and in thermal communication with the liner at the first location where hot beverage is added to the liner using electrical power source available for heating the heat pack at the first location and for powering the electrical beverage brewer;

moving the urn to a second location remote from the first location after the hot beverage has been added; and heating the beverage at the remote location solely by the step of conveying heat from the heat pack to the liner and the hot beverage contained within the liner.

2. The method of claim 1 in which the step of heating the heat pack includes only one of the steps of (a) providing an electrical heating element with electrical power, and (b) radiating the heat pack with microwave radiant energy.

3. A method of self-beating a beverage urn with beverage contained within a liner when removed from any source of power, comprising the steps of:

heating a heat pack contained within the urn and in thermal communication with the liner at a first location where hot beverage is added to the liner using an electrical power available for heating the heat pack at the first location by performing one of the steps of (a) providing an electrical heating element with electrical power, and (b) radiating the heat pack with microwave radiant energy, the step of heating being actuated automatically when the urn is placed into an operative location relative to a brewer to receive freshly brewed beverage into the liner;

moving the urn to a second location remote from the first location after the hot beverage has been added: and heating the beverage at the remote location solely by the step of conveying heat from the heat pack to the liner and the hot beverage contained within the liner.

4. The method of claim 3 in which the step of heating is controlled automatically by a controller of the brewer.

5. The method of claim 2 in which the step of heating is performed by applying electrical power to the electrical heating element when the electrical heating element is located externally of the heat pack and heat is conveyed to the heat pack by conduction from the heating element to the heat pack.

6. The method of claim 2 in which the step of heating is performed by applying electrical power to the electrical heating element when the electrical heating element is located within the heat pack.

7. A method of self-heating a beverage urn with beverage contained within a liner when removed from any source of power, comprising the steps of:

heating a heat pack contained within the urn and in thermal communication with the liner at a first location where hot beverage is added to the liner using an electrical power available for heating the heat pack at the first location, said heat pack being one of (a) a ceramic, (b) high density liquids within a liquid impervious case, (c) a phase-change material, and (d) a zeolite-like material;

moving the urn to a second location remote from the first location after the hot beverage has been added: and heating the beverage at the remote location solely by the step of conveying heat from the heat pack to the liner and the hot beverage contained within the liner.

8. The method of claim 1 in which the step of heating the heat pack is performed relatively quickly, and the step of conveying heat from the heat pack to the beverage is performed relatively slowly.

9. A method of self-heating a beverage urn with beverage contained within a liner when removed from any source of power, comprising the steps of:

providing a heat pack having a phase change material contained within the urn and in thermal communication with the liner at a first location where hot beverage is added to the liner using an electrical power available for heating the heat pack at the first location;

moving the urn to a second location remote from the first location after the hot beverage has been added: and heating the beverage at the remote location solely by the step of conveying heat from the heat pack to the liner and the hot beverage contained within the liner the step of conveying including the step of hydrating the phase change material to create an exothermic phase change of the material after the material has been heated.

10. A method of self-heating a beverage urn with beverage contained within a liner when removed from any source of power, comprising the steps of:

heating a heat pack contained within the urn and in thermal communication with the liner at a first location where hot beverage is added to the liner using an electrical power available for heating the heat pack at the first location;

moving the urn to a second location remote from the first location after the hot beverage has been added; and heating the beverage at the remote location solely by the step of conveying heat from the heat pack to the liner and the hot beverage contained within the liner, and in which the step of conveying includes the step of hydrating a zeolite-like material when in a dehydrated form, and the step of heating results in dehydrating the zeolite-like material to change it to a dehydrated form.

11. A method of self-heating a beverage urn with beverage contained within a liner when removed from any source of power, comprising the steps of:

heating a heat pack contained within the urn and in thermal communication with the liner at a first location where hot beverage is added to the liner using an electrical power available for heating the heat pack at the first location, the step of heating the heat pack including directly heating a core of a ceramic sandwich having ceramic outer layer enveloping the core and having a thermal conductivity greater than that of the ceramic outer layer;

moving the urn to a second location remote from the first location after the hot beverage has been added; and heating the beverage at the remote location solely by the step of conveying heat from the heat pack to the liner and the hot beverage contained within the liner.

12. The method of claim 11 in which the core is an electrical heating element contained within the ceramic outer enveloping layer.

13. The method of claim 11 in which the core is a ceramic material having a thermal characteristic relative to the ceramic material of the outer layer enabling the core to be heated relatively rapidly compared to the ceramic material of the outer layer.

14. The method of claim 13 in which the step of heating includes the step of relatively rapidly heating the core, and the step of conveying includes the step of relatively slowly conveying heat from the core through the outer layer to the beverage.

15. A method of self-heating a beverage urn with beverage contained within a liner when removed from any source of power, comprising the steps of:

heating a heat pack contained within the urn and in thermal communication with the liner at a first location where hot beverage is added to the liner using an electrical power available for heating the heat pack at the first location, the step of heating including the step of selectively heating the heat pack to different temperatures associated with different quantities of hot beverage being added to the liner;

moving the urn to a second location remote from the first location after the hot beverage has been added: and heating the beverage at the remote location solely by the step of conveying heat from the heat pack to the liner and the hot beverage contained within the liner.

16. The method of claim 15 in which the different quantities are added to the liner in response to manual selections at a beverage providing apparatus of different quantities of beverage, and the beverage providing apparatus automatically heats the heat pack to the different temperatures in response to the manual selections of the associated quantities of beverage while the selected quantity is being added to the liner.

17. The method of claim 15 in which the different temperatures are achieved by performing one of the steps of (a) changing the duration that electrical power is provided to a heat source having a fixed heat output, and (b) changing the heat output during a heating period of fixed duration.

18. A method of maintaining temperature of a hot beverage contained within a liner of a beverage urn when the beverage urn is removed from any source of electrical power, comprising the steps of:

brewing hot beverage directly into the interior of the beverage urn with a hot beverage brewer;

heating a heat pack temporarily separated from the urn using an electrical power source adjacent the brewer;

disconnecting electrical power from the electrical power source;

installing the heat pack into a heat pack compartment within the urn an in thermal communication with the liner after the heat pack has been heated to a preselected temperature;

moving the urn to a serving location; and heating the beverage solely by the step of conveying heat from the heat pack to the hot beverage contained within the urn.

19. The method of claim 18 in which the step of heating the heat pack is performed at a first location where the hot beverage is brewed directly into the interior of the urn using an electrical power available for heating the heat pack at the first location.

20. The method of claim 19 in which the serving location is remote from the hot beverage brewer and the step of moving includes moving the urn to the remote serving location from the first location after the hot beverage has been added.

21. The method of claim 19 in which the step of heating the heat pack includes only one of the steps of (a) providing an electrical heating element with electrical power, and (b) radiating the heat pack with microwave radiant energy.

22. The method of claim 21 in which the step of heating is perform by applying electrical power to the electrical heating element when the electrical heating element is located within the heat pack.

23. The method of claim 18 in which the heat pack is one of (a) a ceramic, (b) high density liquids within a liquid impervious case, (c) a phase-change material, and (d) a zeolite-like material.

24. The method of claim 18 in which the step of heating the heat pack is performed relatively quickly and the step of conveying heat from the heat pack to the beverage is performed relatively slowly.

25. The method of claim 18 in which the step of conveying includes the step of hydrating a phase change material to create an exothermic phase change of the phase change material.

26. The method of claim 18 in which the step of conveying includes the step of hydrating a zeolite-like material when in a dehydrated form and the step of heating results in dehydrating the zeolite-like material to change it to a dehydrated form.

27. The method of claim 18 in which the step of heating includes directly heating a core of a ceramic sandwich having a ceramic outer layer enveloping the core and having a thermal conductivity greater than that of the ceramic outer layer.

28. The method of claim 27 in which the core is an electrical heating element contained within the ceramic outer enveloping layer.

29. The method of claim 27 in which the core is a ceramic material having a thermal characteristic relative to the ceramic material of the outer layer enabling the core to be heated relatively rapidly compared to the ceramic material of the outer layer.

30. The method of claim 29 in which the step of heating includes the step of relatively rapidly heating the core and the step of conveying includes the step of relatively slowly conveying heat from the core through the outer layer to the beverage.

31. The method of claim 18 including the step of selectively heating the heat pack to different temperatures associated with different quantities of hot beverage being added to the liner.

32. The method of claim 31 in which the different temperatures are achieved by performing one of the steps of (a) changing the duration that electrical power is provided to a heat source having a fixed heat output, and (b) changing the heat output during a heating period of fixed duration.

33. A method of maintaining temperature of a hot beverage within a beverage urn, comprising the steps of:

directly brewing as hot beverage into an urn body having an outer housing protectively containing a liner for storage of the hot beverage;

heating from an external source of power a heat pack in heat transferring relationship with the liner while mounted within a compartment during the step of directly brewing;

moving the urn to a serving location spaced from the external source power; and transferring heat from the heat pack to the liner and the beverage contained within the liner at the serving location.

34. The method of claim 33 in which the step of heating the heat pack includes the step of transferring heating power from outside of the urn body to the heat pack via a metal, heat conductive bottom defining a bottom of the compartment supporting the heat pack.

35. A method of maintaining temperature of a hot beverage within a beverage urn, comprising the steps of:

inserting a hot beverage within an urn body having an outer housing protectively containing a liner for storage of hot beverage; and heating from an external source of power a heat pack in heat transferring relationship with the liner while mounted within a compartment;

moving the urn to a serving location spaced from the external source of power; and transferring heat from the heat pack to the liner and the beverage contained within the liner at the serving location by the step conducting heat via a heat conductive leg extending from the compartment to a bottom of the body to transfer heat from the bottom to the interior of the compartment and the heat pack.

36. A method of maintaining temperature of a hot beverage within a beverage urn, comprising the steps of:

inserting a hot beverage within an urn body having an outer housing protectively containing a liner for storage of hot beverage; and heating from an external source of power a heat pack in heat transferring relationship with the liner while mounted within a compartment with an electrical heating element contained within the compartment;

moving the urn to a serving location spaced from the external source power; and transferring heat from the heat pack to the liner and the beverage contained within the liner at the serving location.

37. A method of maintaining temperature of a hot beverage within a beverage urn, comprising the steps of:

inserting a hot beverage within an urn body having an outer housing protectively containing a liner for storage of hot beverage; and heating from an external source of power a heat pack in heat transferring relationship with the liner while mounted within a compartment wherein the step of heating including the step of making electrical contact with an electrical contact making means located outside of the body between an electrical heating element within the compartment and a source of electrical power;

moving the urn to a serving location spaced from the external source of power; and transferring heat from the heat pack to the liner and the beverage contained within the liner at the serving location.

38. The method of claim 37 including the steps of moving the urn into an operative urn position of a brewer to receive brewed beverage from the brewer, passing freshly brewed beverage directly from the brewer to the urn while located at the operative urn position, and making electrical connection with an electrical connector positioned relative to the operative urn position for making mating electrical connection with the electrical contact making means of the urn automatically when the urn body is moved into the operative urn position.

39. A method of maintaining temperature of a hot beverage within a beverage urn, comprising the steps of:

inserting a hot beverage within an urn body having
an outer housing protectively containing a liner for storage of hot beverage; and heating from an external source of power a heat pack in heat transferring relationship with the liner while mounted within a compartment;

moving the urn to a serving location spaced from the external source of power; and transferring heat from the heat pack to the liner and the beverage contained within the liner at the serving location by applying electrical power to an electrical heating element contained within a ceramic-like, hollow body within which the electrical heating element is contained.

40. The method of claim 33 in which the means for heating includes means for conveying microwave radiation to the heat pack from an external source.

41. The self-heating urn of claim 40 in which the step of conveying includes the step of conveying radiation through a non-metallic window to the compartment that is transparent to microwave energy.

42. A method of maintaining temperature of a hot beverage within a beverage urn, comprising the steps of:

inserting a hot beverage within an urn body having
an outer housing protectively containing a liner for storage of hot beverage; and heating from an external source of power a heat pack in heat transferring relationship with the liner while mounted within a compartment, said heat pack being one of (a) a ceramic, (b) high density liquids within a liquid impervious case, (c) a phase-change material, and (d) a zeolite-like material.

43. A method of maintaining temperature of a hot beverage within a beverage urn, comprising the steps of:

inserting a hot beverage within an urn body having
an outer housing protectively containing a liner for storage of hot beverage, and
a compartment for containing a heat pack having a zeolite-like material that is one of (a) hydrated salt and (b) a eutectic salt;

heating the heat pack by adding water vapor to the zeolite-like material to initiate an exothermic phase change reaction;

placing the heat pack into the compartment in heat transferring relationship with the liner for transferring heat from the heat pack to the liner and the beverage contained within the liner;

moving the urn to a serving location spaced from the external source of power; and transferring heat from the heat pack to the liner and the beverage contained within the liner at the serving location.

44. A method of maintaining temperature of a hot beverage within a beverage urn, comprising the steps of:

sinserting a hot beverage within an urn body having
an outer housing protectively containing a liner for storage of hot beverage, and
a compartment for containing a heat pack formed of a composite ceramic sandwich having an interior ceramic core with a relatively high rate of heat transfer contained within an outer envelope layer of ceramic of relatively low rate of heat transfer;

heating the interior ceramic core;

placing the heat pack into the compartment in heat transferring relationship with the liner for transferring heat from the heat pack to the liner and the beverage contained within the liner;

moving the urn to a serving location spaced from the external source of power; and transferring heat from the heat pack to the liner and the beverage contained within the liner at the serving location.

45. A method of maintaining temperature of a hot beverage within a beverage urn, comprising the steps of:

directly brewing a hot beverage into an urn body during a brew cycle a brewer having
an outer housing protectively containing a liner for storage of hot beverage, and
a compartment for containing a heat pack;
placing a heat pack within the compartment in heat transferring relationship with the liner for transferring heat from the heat pack to the liner and the beverage contained within the liner;

heating the heat pack during the brew cycle of the brewer with a heat pack heating apparatus associated with the brewer;

moving the urn to a serving location spaced from the brewer; and transferring heat from the heat pack to the liner and the beverage contained within the liner at the serving location.

46. The method of claim 45 in which the step of brewing includes the step of actuating one of (a) a radiant heater, (b) an electrical connector for powering electrical heating element contained within the body, (c) a microwave heater, and (d) a heat conductive member in contact with a bottom surface of the body.

47. The method of 45 in which the heat pack is removably mounted within the body and the step of heating includes the step of heating the heat pack when outside of the body.

48. The method of claim 47 in which the compartment is located beneath the liner.

49. The method of claim 47 in which the compartment has a doorway for receipt and removal of a heat pack.

50. The method of claim 49 including a door for closing the doorway.

51. The method of claim 49 in which the heat pack is a removable heat pack with structural integrity that is independent of external support by the compartment.

52. The method of claim 45 in which the heat pack is heated automatically when a brew cycle is started and the urn is in a brew receiving location of the brewer.

53. The method of claim 45 in which the heat pack heating apparatus is connected to the brewer.

54. The method of claim 1 in which the liner is mounted within an outer container in spaced relationship and the heat pack is located in a gap between the liner and the outer container.

55. The method of claim 54 in which the liner is made of a non-metallic material and the outer container is made of metal, and in which the step of heating the heat pack includes the step of passing heat to the heat pack through the metal container and the step of heating includes the step of passing heat from the heat pack through the non-metallic liner.

56. The method of claim 33 in which the liner is mounted within the outer housing in spaced relationship and the heat pack is located in a gap between the liner and the outer housing.

57. The method of claim 56 which the liner is made of a non-metallic material and the outer container is made of metal, and in which the step of heating the heat pack includes the step of passing heat to the heat pack through the metal container and the step of heating includes the step of passing heat from the heat pack through the non-metallic liner.

* * * * *